United States Patent [19]
Murai et al.

[11] Patent Number: 5,316,875
[45] Date of Patent: May 31, 1994

[54] SECONDARY BATTERY WITH NONAQUEOUS ELECTROLYTE AND METHOD OF MANUFACTURING SAME

[75] Inventors: Hiroyuki Murai, Hirakata; Yasuhiko Bito, Yao; Masaki Hasegawa, Hirakata; Shuji Ito, Kadoma; Yoshinori Toyoguchi, Yao, all of Japan

[73] Assignee: Matsushita Electric Industrial Co., Ltd., Kadoma, Japan

[21] Appl. No.: 916,967

[22] Filed: Jul. 20, 1992

[30] Foreign Application Priority Data

Jul. 19, 1991 [JP] Japan .................. 3-179319
Aug. 27, 1991 [JP] Japan .................. 3-215082
Feb. 18, 1992 [JP] Japan .................. 4-030328

[51] Int. Cl.$^5$ .................. H01M 6/14; H01M 6/16
[52] U.S. Cl. .................. 429/194; 429/221; 429/223; 429/224; 429/197
[58] Field of Search .............. 429/194, 224, 221, 223, 429/197

[56] References Cited

U.S. PATENT DOCUMENTS

| | | | |
|---|---|---|---|
| H829 | 10/1990 | Behl .................. | 429/194 |
| 3,844,837 | 10/1974 | Bennion .................. | 429/194 |
| 4,160,070 | 7/1979 | Gabano .................. | 429/194 |
| 4,450,214 | 5/1984 | Davis .................. | 429/194 |
| 4,464,447 | 8/1984 | Lazzari .................. | 429/194 |
| 4,786,499 | 11/1988 | Slane et al. .................. | 429/194 |

FOREIGN PATENT DOCUMENTS

| | | | |
|---|---|---|---|
| 2254816 | 11/1972 | Fed. Rep. of Germany ...... | 429/194 |
| 0111075 | 8/1980 | Japan .................. | 429/194 |
| 0018371 | 2/1981 | Japan .................. | 429/194 |

*Primary Examiner*—David B. Springer
*Attorney, Agent, or Firm*—Ratner & Prestia

[57] ABSTRACT

There is provided a secondary battery comprising a positive and a negative electrode and a nonaqueous electrolyte. The positive electrode is made by dipping an electrode comprising a positive active material such as $LiMn_2O_4$, $LiMnO_2$, $LiCoO_2$, $LiNiO_2$, $LiFeO_2$ or $\gamma LiV_2O_5$, in a solution containing butyllithium, phenyllithium, or naphthyllithium. The negative electrode of the battery absorbs and desorbs lithium by charging and discharging, and the nonaqueous electrolyte contains a lithium salt. Also provided is a method of manufacturing a secondary battery comprising a nonaqueous electrolyte. The method comprises the steps of preparing an electrode group containing a positive electrode of $LiMn_2O_4$, $LiMnO_2$, $LiCoO_2$, $LiNiO_2$, $LiFeO_2$ or $\gamma$-$LiV_2O_5$, as the active material, and a negative electrode which absorbs and desorbs lithium by charging and discharging, with a separator therebetween. The group is placed in a battery case, and to the case is added a solution containing butyllithium etc. The solution is removed and an organic electrolyte as a nonaqueous electrolyte is added to the battery case.

5 Claims, 2 Drawing Sheets

SECONDARY BATTERY WITH NONAQUEOUS ELECTROLYTE AND METHOD OF MANUFACTURING SAME

BACKGROUND OF THE INVENTION

This invention relates to a secondary battery comprising a nonaqueous electrolyte, containing an improved positive active material, and a method of manufacturing the same.

Secondary batteries containing nonaqueous electrolytes with negative electrodes comprising lithium, lithium alloy or lithium compounds are expected to be of high voltage and high energy density, and have been the subject of intensive research.

Compounds such as $V_2O_5$, $Cr_2O_5$, $MnO_2$, $TiS_2$, etc. have been used as a positive active material in a secondary battery comprising a nonaqueous electrolyte.

Recently, Thackeray et al. reported that $Li_xMn_2O_4$ could serve as a positive active material in a secondary battery comprising a nonaqueous electrolyte (Material Research Bulletin, 18 (1983), 461–472).

The relationship of the x value of $Li_xMn_2O_4$ and the electromotive force is shown in FIG. 2. These data demonstrate that the potential curve has two flat parts, in the vicinity of 4 V and of 2.8 V. Accordingly, $Li_xMn_2O_4$ can be used in a lithium secondary battery of the 4 V class, if it is charged and discharged along the flat part of 4 V, within the range of 3 V to 4.5 V. The open-circuit potential against x-value of another positive active material, $Li_xCoO_2$, is given in FIG. 3. Since the potential curve exhibits flat parts in the vicinity of 4.0 V and of 1.2 V, $Li_xCoO_2$ can also be used in a lithium secondary battery of the 4 V class, by charging and discharging at the flat part of 4 V. Regarding the negative electrode, lithium metal has been the target of research investigations. However, a negative electrode of lithium has disadvantages in that when charged, a dendrite lithium is generated on the surface thereof and, following repeated cycles of charging and discharging, a low charging-discharging efficiency or shortcircuiting within the battery was observed which was due to the contraction of the positive electrode. This led to research on negative active material holders such as carbon, aluminum or its metal or alloy, or other kinds of oxides which absorb and desorb lithium in the absence of accumulation of dendrite.

In a secondary battery comprising carbon or aluminum as the negative active material holder, $LiMn_2O_4$, $LiMnO_2$, $LiCoO_2$, $LiNiO_2$ $LiFeO_2$ or $\gamma\text{-}LiV_2O_5$ as the positive active material, and a non-aqueous organic electrolyte such as lithium perchlorate organic solvent solution, the first charging causes lithium ions to be released from the positive active material and to be absorbed by the negative active material, and the subsequent discharge causes the transfer of lithium from the negative active material to the positive active material. The lithium ions taking part in the battery reaction are confined solely to the ions which existed in the positive electrode at the beginning of the cycle. These ions therefore determine the capacity of the battery. In a battery comprising the above described negative active material, the lithium which is absorbed by the negative active material during the first charging cycle is not necessarily released during the subsequent discharging event. (The amount of lithium absorbed by the negative active material is greater than that released by the negative active material: this is the charging-discharging capacity difference). When lithium is taken up by the negative active material but does not participate in the remaining events in the battery, the number of lithium ions capable of cycling during charging and discharging is decreased, resulting in a decline in battery capacity.

In order to enhance the lithium capacity of the negative active material holder, use of $Li_xMn_2O_4$, $Li_xMnO_2$ $Li_xCoO_2$, $Li_xNiO_2$, $Li_xFeO_2$, or $\gamma\text{-}Li_2V_2O_5(x>1)$ as the positive active material containing an excess of lithium ions has been proposed.

In order to synthesize these materials, methods have been developed to add excess lithium salt to the raw material of each compound, or alternatively the lithium content of the positive active material can be increased by the addition of butyllithium (Japanese Patent Application Laid-Open, No. Toku-Kai-Hei 2-265167). Regarding the former method, however, $Li_xMn_2O_4$, $Li_xMnO_2$, $Li_xCoO_2$, $Li_xNiO_2$, $Li_xFeO_2$ or $\gamma\text{-}Li_xV_2O_5(x>1)$ obtained by the addition of excess lithium by heating, react with moisture in the air and decompose to form $LiMn_2O_4$, $LiMnO_2$, $LiCoO_2$, $LiNiO_2$, $LiFeO_2$ or $\gamma\text{-}LiV_2O_5$ and LiOH or the like. Thus, these compounds ($Li_xMn_2O_4$ etc.) cannot tolerate the application of water as a solvent during pulverization or classification after synthesis. Instead, the processes must be carried out in air, or inert gas without moisture. Regarding the second method wherein the positive active material is doped with lithium by dipping the material powder, after synthesis, into butyllithium as a lithium-adding liquid, the positive active material containing excessive lithium is unstable in a moist atmosphere. Thus, these steps must also be carried out in a dry atmosphere using a nonaqueous solvent.

BRIEF DESCRIPTION OF THE INVENTION

The present invention features a secondary battery comprising a nonaqueous electrolyte which does not undergo a reduction in capacity due to the differences in the charging and discharging capacity of the negative electrode.

The invention also features a method of manufacturing such a secondary battery.

To obtain the battery of the invention, the positive electrode plate of the battery is prepared, by dipping an electrode plate comprising a positive active material into a solution containing butyllithium $CH_3\text{—}CH_2\text{—}CH_2\text{—}CH_2\text{—}Li$,

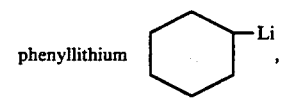
phenyllithium

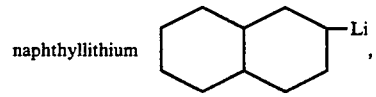
naphthyllithium or other lithium-adding material.

If carbon is used as the negative active material holder, it is dipped in a liquid containing a lithium-adding material such as butyllithium, phenyllithium, or naphthyllithium such that it absorbs an amount of lithium corresponding to the charging-discharging capacity difference of the electrode.

Then an electrode group comprising the positive electrode, the negative electrode with a separator therebetween is dipped in a liquid containing the above described lithium-adding material. The assembly is then placed in a battery case, which is supplied with the lithium-adding material and electrolyte. This is sealed to form the final battery.

Further, according to the invention, lithium-adding material may also be added to the electrolyte in the battery.

In the method of manufacturing a secondary battery comprising a nonaqueous electrolyte, the process for increasing the lithium content of the positive and negative active material is accomplished after assembly of the electrode. A nonaqueous solvent is not necessary for the process of making positive and negative electrode plates, nor is it necessary to carry out the process in an atmosphere of dry inert gas or air. Further, the fact that the lithium-adding material is poured into the battery case after placing the electrode assembly in the battery case, inhibits relaxation of the electrode and thus improves the work efficiency of the battery assembly.

DETAILED DESCRIPTION

Figure 1:
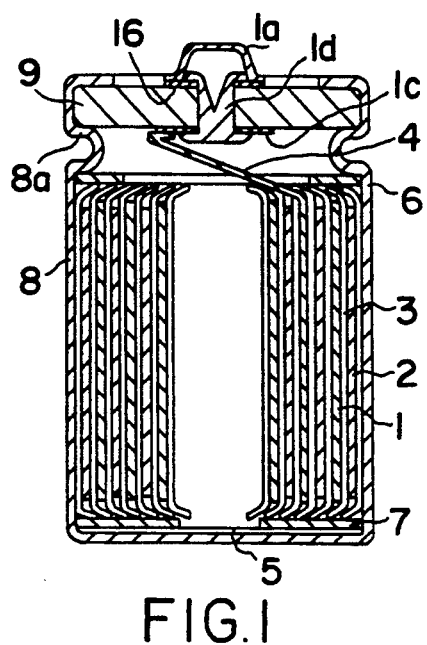
FIG. 1 is a section of a battery according to the present invention.

Now, referring to the drawings, the specific embodiments of the present invention are described below.

EMBODIMENT 1

$LiMn_2O_4$ was synthesized from $Li_2CO_3$ and $Mn_3O_4$ by mixing these compounds in a 3:4 mol ratio followed by heating at 900° C. $LiCoO_2$ was synthesized from $Li_2CO_3$ and $CoCO_3$ by mixing these compounds in a 1:2 mol ratio followed by heating at 900° C. $LiMnO_2$ was obtained by mixing $Li_2CO_3$ and $MnCO_3$ in a 1:2 mol ratio followed by heating at 800° C. $LiNiO_2$ was obtained by mixing LiOH and $Ni(NO_3)_2$ in a 1:1 mol ratio followed by heating at 800° C. $LiFeO_2$ was obtained by mixing $Li_2CO_3$ and $Fe(OH)_3$ in a 1:2 mol ratio followed by heating at 650° C. $\gamma$-$LiV_2O_5$ was obtained by mixing $Li_2CO_3$ and $V_2O_5$ in a 1:2 mol ratio followed by heating at 700° C.

These materials were pulverized and resulting portions thereof which were below 100 mesh were used as the positive active material.

A positive electrode plate was prepared as follows:

One hundred grams of a positive active material, 10 g of carbon powder as conducting agent, and 5 g of polytetraethylenefluoride (PTFE) as binder was made into a paste using water. This paste was applied to a core sheet of titanium, and was then dried. The collector, covered with the paste, was dipped in a hexane solution of n-butyllithium, $CH_3$—$CH_2$—$CH_2$—$CH_2$—Li, at a concentration of 1.65 mol/l to form a positive electrode plate, wherein the active electrode material was converted to either $Li_{1.15}Mn_2O_4$, $Li_{1.15}MnO_2$, $Li_{1.15}CoO_2$, $Li_{1.15}NiO_2$, $Li_{1.15}FeO_2$, or $\beta$-$Li_{1.15}V_2O_5$, by adjusting the dipping time.

One hundred grams of graphite, as a negative active material holder, 10 g of PTFE as binder and water, was made into a paste. The paste was applied on a core sheet of nickel, and was then dried to form the negative electrode.

Batteries comprising a positive electrode and a negative electrode as described above (A), (B), (C), (D), (E), and (F), and shown in Table 1, were fabricated, according to the method described below.

TABLE 1

| Battery Positive Active Material | Voltage Range Of Charging & Discharging | Note |
|---|---|---|
| EMBODIMENT | | |
| Battery $Li_{1.15}Mn_2O_4$ (A) | 4.3-3.0 | Electrode Plate Treated |
| Battery $Li_{1.15}CoO_2$ (B) | 4.3-3.0 | Electrode Plate Treated |
| Battery $Li_{1.15}MnO_2$ (C) | 4.3-3.0 | Electrode Plate Treated |
| Battery $Li_{1.15}NiO_2$ (D) | 4.3-3.0 | Electrode Plate Treated |
| Battery $Li_{1.15}FeO_2$ (E) | 4.3-3.0 | Electrode Plate Treated |
| Battery $\gamma$-$Li_{1.15}V_2O_5$ (F) | 4.0-3.0 | Electrode Plate Treated |
| COMPARISON 1 | | |
| Battery $LiMn_2O_4$ (a1) | 4.3-3.0 | Not Treated |
| Battery $LiCoO_2$ (b1) | 4.3-3.0 | Not Treated |
| Battery $LiMnO_2$ (c1) | 4.3-3.0 | Not Treated |
| Battery $LiNiO_2$ (d1) | 4.3-3.0 | Not Treated |
| Battery $LiFeO_2$ (e1) | 4.3-3.0 | Not Treated |
| Battery $\gamma$-$LiV_2O_5$ (f1) | 4.0-3.0 | Not Treated |
| COMPARISON 2 | | |
| Battery $LiMn_2O_4$ (a2) | 4.3-3.0 | Active Material Treated |
| Battery $LiCoO_2$ (b2) | 4.3-3.0 | Active Material Treated |
| Battery $LiMnO_2$ (c2) | 4.3-3.0 | Active Material Treated |
| Battery $LiNiO_2$ (d2) | 4.3-3.0 | Active Material Treated |
| Battery $LiFeO_2$ (e2) | 4.3-3.0 | Active Material Treated |
| Battery $\gamma$-$LiV_2O_5$ (f2) | 4.0-3.0 | Active Material Treated |

Referring to FIG. 1, an electrode group was made comprising a positive electrode plate 1 and a negative electrode plate 2, by rolling both electrodes in to a cylindrical form, with a separator 3 of porous polypropylene therebetween. The positive and negative electrode plates are attached to, by spot welding, a positive electrode lead 4 and negative electrode lead 5 comprising the same material as the core sheets of the electrodes respectively. The separator is wider than both electrodes. The electrode group, with insulating plates 6 and 7 of polypropylene thereupon and thereunder, was placed in a battery case 8 comprising a metal, wherein the bottom plate also serves as the negative terminal of the battery. The positive electrode lead 4 is spot-welded with a washer 1c, which is fixed under a seal 9 by a eyelet-like metal 1d with an upper washer 1b on the upper side. The negative electrode lead 5 is spot-welded to the inner side of the bottom of the battery case. After making a bended part 8a on the upper part of the battery case, nonaqueous electrolyte of polypropylene carbonate

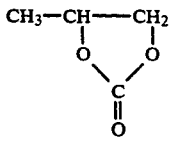

containing 1 mol/l of lithium perchlorate, LiClO₄, was poured into the battery case. The seal 9 with positive terminal 1a spot-welded to the upper washer 1b, is fixed on the battery case by bonding the upper edge of the battery case to complete the battery.

For comparison 1, batteries (a1), (b1), (c1), (d1), (e1), and (f1) were fabricated using positive electrodes made by coating a core sheet of titanium with a paste and then drying the paste. The paste was prepared using 100 g of positive active material comprising $LiMn_2O_4$, $LiMnO_2$, $LiCoO_2$, $LiNiO_2$, $LiFeO_2$ or $\gamma\text{-}LiV_2O_5$, 10 g of carbon powder as a conducting agent, and 5 g of PTFE as a binder, which were mixed together with water.

For comparison 2, batteries (a2), (b2), (c2), (d2), (e2), and (f2) were fabricated using positive electrodes prepared by the same method as that described for Comparison 1, but the powders comprising the positive active materials were dipped in a solution containing n-butyllithium.

Batteries so fabricated were charged and discharged within the voltage range shown in Table 1 using a charging and discharging current of 0.5 mAh/cm². The results are given in Table 2.

TABLE 2

| | | | | Unit: mAh |
|---|---|---|---|---|
| | 1st cycle | | 2nd cycle | |
| Battery | Charge | Discharge | Charge | Discharge |
| Embodiment | | | | |
| (A) | 492 | 409 | 409 | 408 |
| (B) | 552 | 461 | 460 | 460 |
| (C) | 533 | 449 | 450 | 450 |
| (D) | 560 | 473 | 473 | 473 |
| (E) | 515 | 429 | 430 | 429 |
| (F) | 500 | 418 | 418 | 418 |
| Comparison 1 | | | | |
| (a1) | 410 | 328 | 327 | 327 |
| (a1) | 462 | 369 | 368 | 368 |
| (a1) | 440 | 353 | 353 | 353 |
| (a1) | 473 | 387 | 388 | 388 |
| (a1) | 421 | 337 | 336 | 336 |
| (a1) | 409 | 328 | 328 | 328 |
| Comparison 2 | | | | |
| (a2) | 380 | 309 | 308 | 308 |
| (a2) | 440 | 350 | 351 | 351 |
| (a2) | 420 | 331 | 332 | 332 |
| (a2) | 450 | 366 | 365 | 364 |
| (a2) | 400 | 315 | 316 | 315 |
| (a2) | 390 | 310 | 311 | 311 |

Figure 2:
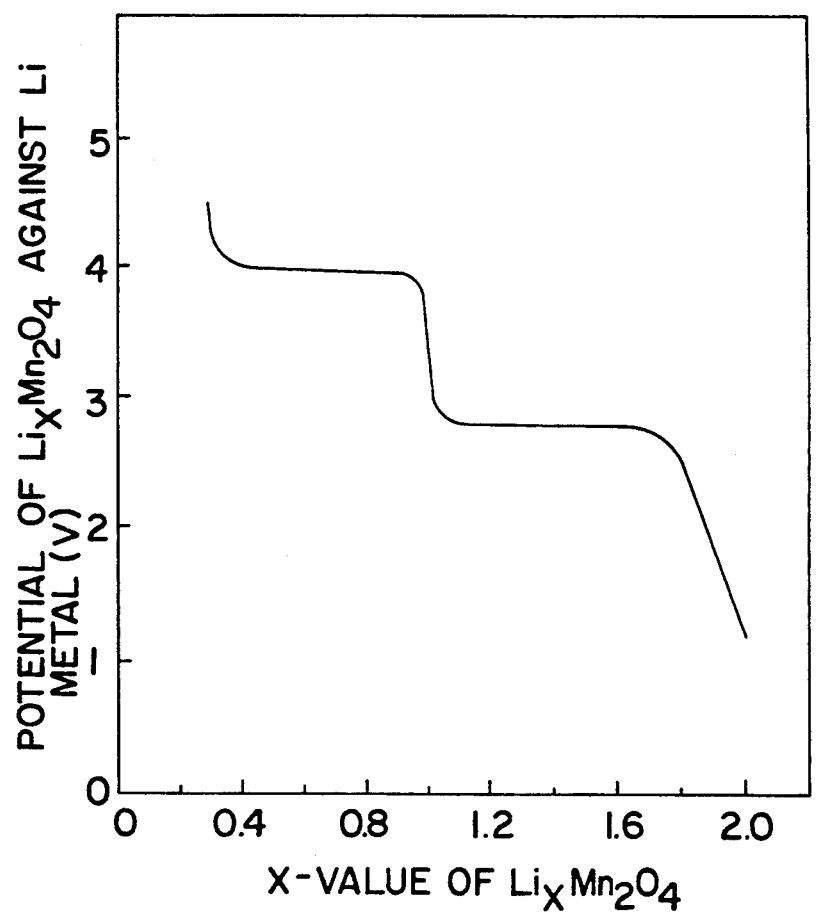
FIG. 2 is a graph showing the relationship between the quantity of x in $Li_xMn_2O_4$, a positive active material, and the electromotive force.
Figure 3:
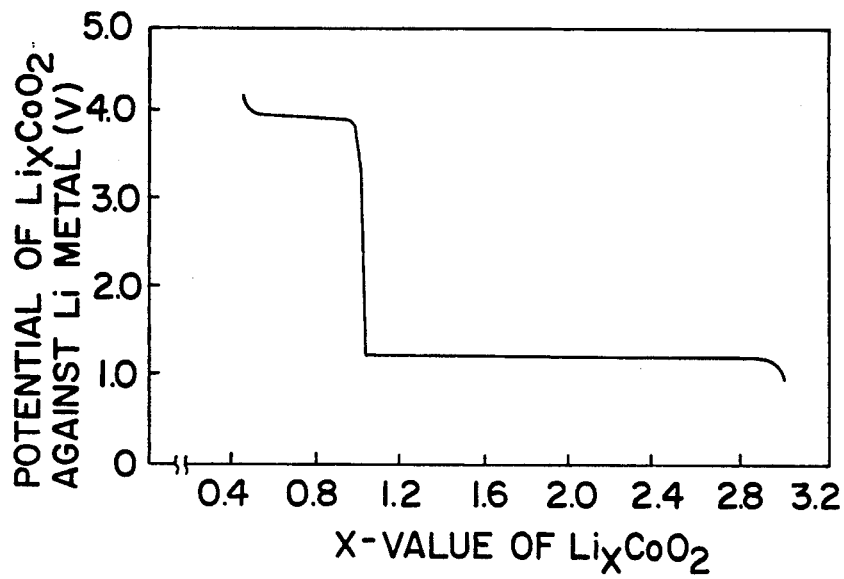
FIG. 3 is a graph giving the relationship between the quantity of x in $Li_xCoO_2$, a positive active material, and the electromotive force.

As shown in FIG. 2, the potential of the positive active material $Li_xMn_2O_4$ can be varied by desorbing or absorbing lithium by charging or discharging respectively. When the charging and discharging is conducted within the range of 3.0 to 4.5 V, the value of x changes from 1.0 to 0.3, and the quantity of Li capable of being used for charging and discharging in the range of 3.0 to 4.5 V is about 0.7 electrons. Therefore, by using this positive active material, a battery of large capacity is obtained, provided all the lithium (0.7 electrons) capable of being used for charging and discharging between 3.0 V and 4.5 V are used.

However, in the case of the battery (a1) wherein graphite is used as a negative active material holder for the negative electrode, the charging capacity for the first cycle was 410 mAh while the discharging capacity was 328 mAh, the difference being 82 mAh. The lithium corresponding to the difference of 82 mAh between charging and discharging of the first cycle was absorbed by the graphite negative active material holder, and did not participate in the charging or discharging thereafter, so that the battery capacity of the second cycle was 327 mAh.

In this case, since an amount of lithium equivalent to 0.15 electron is absorbed in the graphite during charging in the first cycle and does not participate in the battery reaction thereafter, the x value of $Li_xMn_2O_4$, the positive active material, varies in the range of 0.85 to 0.3. In addition, the quantity of lithium used during charging and discharging is 0.55 electrons. Accordingly, when graphite is used as the negative electrode, a decrease in capacity of about 20% results.

When batteries (b1), (c1), (d1), (e1), and (f1) in Comparison 1 using $LiMnO_2$, $LiCoO_2$, $LiNiO_2$, $LiFeO_2$, and $\gamma\text{-}LiV_2O_5$ as the positive active material, respectively, were tested, the capacity of the second cycle was 320 to 390 mAh for the same reason as that discussed above.

In contrast, battery (A), an embodiment of the present invention, has $LiMn_2O_4$ (x=1.15) as its positive active material. This includes excess lithium corresponding to the difference in the charging and discharging capacity of battery (a1). Battery (A), when charged and discharged, has a charging capacity of 493 mAh and discharging capacity of 411 mAh during the first cycle. A charging-discharging difference of 82 mAh occurred, and the corresponding lithium was absorbed in the negative active material holder, graphite, and did not participate in the charging or discharging reaction thereafter, similar to the situation in battery (a1). However, the lithium which was absorbed in graphite and did not participate in the charging and discharging was compensated for by the excess lithium (0.15 electrons) in the positive active material, and, therefore, during charging and discharging in the second cycle, the x value in the positive active material, $Li_xMn_2O_4$, varied in the range of 1.0 to 0.3. Thus, the amount of lithium used in charging and discharging was 0.7 electrons, therefore correcting for the capacity decrease in the battery due to negative active material holder.

Similarly, for batteries (B), (C), (D), (E), and (F), the charging-discharging capacities during the second cycle were observed to be greater than those of batteries (b1), (c1), (d1), (e1), and (f1) in Comparison 1.

Figure 4:
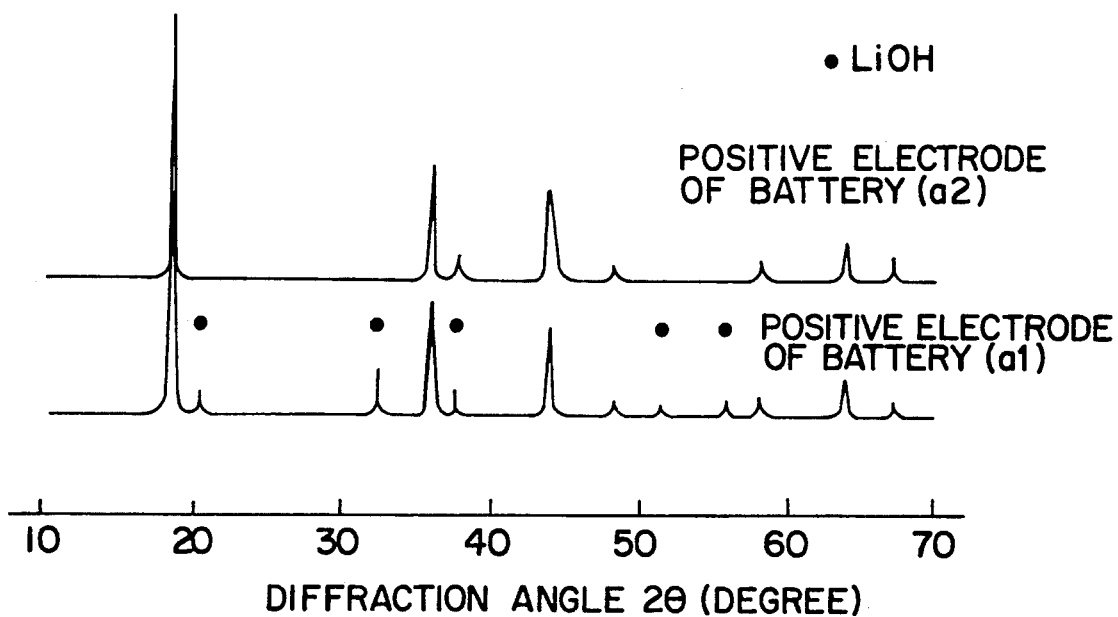
FIG. 4 is a x-ray diffraction diagram of the positive electrode plates used in batteries (a1) and (a2).

Regarding batteries (a2), (b2) (c2), (d2), (e2), and (f2) in Comparison 2, capacities were further diminished using batteries (a1) to (f1) containing positive active materials which did not have excess lithium. The results of X-ray diffraction of the positive electrode plate of battery (a2) of Comparison 2 as well as that of battery (a1) are shown in FIG. 4. FIG. 4 demonstrates that the electrode plate of battery (a1) has a diffraction pattern of $LiMn_2O_4$ of spinel structure, while the electrode plate of battery (a2) has not only the diffraction peak of $LiMn_2O_4$ of spinel structure but also another diffraction peak, presumably of LiOH. From these observations, it is presumed that, in the electrode of battery (a2), the $Li_{1.15}Mn_2O_4$ containing excess lithium reacted with the water which was used in the fabrication of the electrode. The $Li_{1.15}Mn_2O_4$ therefore decomposed to $LiMn_2O_4$ and LiOH and this resulted in a reduction in the capacity of the battery.

As for the batteries (b2), (c2), (d2), (e2), and (f2), the battery capacities also reduced for the reasons given above.

EMBODIMENT 2

Now, another example is explained, wherein, instead of using graphite as described for Embodiment 1, aluminum powder is used as the negative active material holder, which has a much greater difference in charging-discharging capacity.

Similar to Embodiment 1, a positive electrode plate comprising $LiMn_2O_4$ as the active material holder was prepared. One hundred grams of $LiMn_2O_4$ were mixed with 10 g of carbon powder as conducting agent, 5 g of PTFE as binder, and water to make a paste, which was applied on a core sheet of titanium. This was then dried. The electrode was then dipped in a hexane solution of n-butyllithium to generate a value for x in $Li_xMn_2O_4$ of 1.35.

For the negative electrode, to 100 grams of aluminum powder as an active material holder, was added 10 grams of PTFE, as a binder, and water to generate a paste, which was put on a core sheet of nickel and was dried.

Using these positive and negative electrode plates so prepared and carrying out the remaining steps as described for Embodiment 1, a battery was assembled and was designated as (G).

For comparison, a battery (g1) was fabricated using as a positive electrode, $LiMn_2O_4$ as an active material to which excess lithium was not added and a negative electrode comprising aluminum powder. In addition, a battery (g2) was fabricated with a positive electrode prepared from a mixture of $Li_{1.35}Mn_2O_4$ active material as an electric conducting agent, a binder, and water. The negative electrode was the same as that described above. The active material, $Li_{1.35}Mn_2O_4$, was made by dipping $LiMn_2O_4$ in a hexane solution of n-butyllithium.

These batteries (G), (g1), and (g2) were charged and discharged using a current of 0.5 $mAh/cm^2$ within the voltage range of 3.0 to 4.2 V. The results of this charging and discharging are shown in Table 3.

TABLE 3

| Battery | 1st cycle | | 2nd cycle | |
| --- | --- | --- | --- | --- |
| | Charge | Discharge | Charge | Discharge |
| (G) | 616 | 410 | 409 | 409 |
| (g1) | 412 | 206 | 205 | 205 |
| (g2) | 395 | 190 | 191 | 190 |

The battery (g1) which uses $LiMn_2O_4$ as the positive active material exhibited in the first cycle a charging capacity of 412 mAh but a discharging capacity of only 206 mAh. This was due to the large charging-discharging difference (206 mAh) because aluminum was used as the negative active material holder.

In contrast, battery (G), which embodies the present invention, exhibited a charging capacity of 614 mAh and a discharging capacity of 411 mAh, because the $Li_{1.35}Mn_2O_4$ present therein was used to provide excess lithium to compensate for the charging-discharging capacity difference of the negative electrode. Comparing the charging-discharging capacity difference during the second cycle of the battery (G) of the present embodiment and the battery (g1) for comparison, the capacity of the present embodiment was found to be about twice as great. Also, battery (g2) had the smallest capacity among the three batteries, for the same reasons as those discussed for Embodiment 1.

A similar situation to that when $LiMn_2O_4$ was used as the active material was obtained with batteries wherein the positive active material comprised at least one compound selected from the group consisting of $LiMnO_2$, $LiCoO_2$, $LiNiO_2$, $LiFeO_2$ and $\gamma\text{-}LiV_2O_5$ described in Embodiment 1.

EMBODIMENT 3

In Embodiments 1 and 2, the positive electrode was treated in order to increase its lithium content. In Embodiment 3 a battery was fabricated wherein the negative electrode was obtained by mixing a negative electrode mixture with graphite as the negative active material holder and then dipping the resulting mixture in a solution containing n-butyllithium.

To 100 grams of graphite or negative active material holder was added 10 grams of PTFE as a binder and water to form a paste. This was applied to a core sheet of nickel and dried to form the negative electrode plate. This plate was dipped in a hexane solution of n-butyllithium for a prescribed time in order to obtain a negative electrode plate containing lithium which exhibits 30 mAh per 1 g of negative active material holder in the negative material mixture.

The positive electrode plates were made of $LiMn_2O_4$ and $LiCoO_2$ as the active material. To 100 grams of the active material was added 10 grams of carbon powder as a conducting agent, 5 grams of PFTE as a binder, and water to make a paste which was applied to a core sheet of titanium and was then dried.

Batteries were assembled comprising the above described positive and negative electrodes in a similar manner as described in Embodiment 1. The battery containing $LiMn_2O_4$ as the positive active material was designated as (H), and that with $LiCoO_2$ as the positive active material as (I). These batteries were charged and discharged and the results are shown in Table 4.

TABLE 4

| | 1st cycle | | 2nd cycle | (Unit: mAh) |
| --- | --- | --- | --- | --- |
| Battery | Charge | Discharge | Charge | Discharge |
| (H) | 493 | 408 | 409 | 409 |
| (I) | 554 | 463 | 460 | 460 |
| (a1) | 410 | 328 | 327 | 327 |
| (b2) | 462 | 369 | 368 | 368 |

As can be seen, the charging and discharging capacity of battery (H) during the first cycle is 409 mAh. The discharging capacity of this battery was comparable to the charging capacity of battery (a1) during its first cycle. Battery (I) also did not exhibit a decrease in capacity and was therefore a large capacity battery. Thus, using n-butyllithium treatment, lithium can be caused to be absorbed in graphite even while present in a negative electrode mixture. This process has the advantage that a nonaqueous solvent is not necessary for preparation of the mixture which distinguishes this process from that described in Embodiment 1.

In addition to $LiMn_2O_4$ and $LiCoO_2$ as positive active material, similar results were obtained when $LiMnO_2$, $LiNiO_2$, $LiFeO_2$ and $\gamma\text{-}LiV_2O_5$ were used.

EMBODIMENT 4

In this embodiment, the positive electrode and the negative electrode combined with a separator therebetween were placed in a battery case, and then were treated with a lithium-adding material as follows.

To 100 grams of positive active material, $LiMn_2O_4$, was added 10 grams of a conducting agent carbon powder, 10 grams of a binder PFTE, and water to form a paste, which was put on a core sheet of titanium and was dried, to form a positive electrode plate. The negative electrode plate was prepared using the method described in Embodiment 1. The positive and negative electrode plates were separated by a band which was wider than either of these plates. This was then rolled to form an electrode group. The electrode group, with insulating plates of polypropylene thereupon and thereunder, was inserted in a battery case.

Hexane solution containing n-butyllithium was poured into the battery case, and, after a prescribed time, the solution was removed. Then a nonaqueous electrolyte such as polypropylene carbonate solution of lithium perchlorate at a concentration of 1 mol/l was added to the battery case which was closed with a seal plate to form battery (J).

Battery (J) was subjected to charging and discharging using a current of 0.5 $mAh/cm^2$ within the voltage range of 3.0 to 4.3 V. The charging and discharging capacities of the first and second cycles of battery (J) are given in Table 5.

TABLE 5

|  | 1st cycle | | 2nd cycle | (Unit: mAh) |
|---|---|---|---|---|
| Battery | Charge | Discharge | Charge | Discharge |
| (J) | 494 | 413 | 413 | 412 |
| (a1) | 410 | 328 | 327 | 327 |
| (b2) | 390 | 309 | 308 | 308 |

As can be seen, the charging capacity was 494 mAh, and the discharging capacity was 413 mAh during the first cycle.

Compared to batteries (a1) and (a2), the charging and discharging capacities of battery (J) were 85 mAh and 104 mAh larger, respectively. Thus, a battery which was fabricated by first inserting an electrode group of rolled positive and negative electrodes with a separator therebetween into a battery case and then pouring a solution of butyllithium therein, exhibited no decrease in capacity due to a charging-discharging capacity difference. In this way, a large capacity was obtained.

A battery was fabricated by dipping an electrode group of electrode plate and separator which were rolled together into a solution of butyllithium or phenyllithium. This was dried and inserted in a battery case to which was added a nonaqueous electrolyte containing a lithium salt. This battery exhibited the same advantages as battery (J) described above. This battery also had an additional advantage because slackening of the electrode which is caused by swelling when dipped, is avoided and therefore fabrication efficiency is improved.

The above examples used $LiMn_2O_4$ as the positive active material and graphite as the negative active material holder. However, this method is, of course, efficacious for all of the combinations of positive electrodes wherein $LiMn_2O_4$, $LiCoO_2$, $LiNiO_2$, $LiFeO_2$ or $\gamma$-$LiV_2O_5$ are used as the positive active material, and negative electrodes which have a capacity difference during the first cycle of charging and discharging, such as graphite or aluminum.

EMBODIMENT 5

The synthesis of $LiMn_2O_4$ and $LiCoO_2$ was accomplished using the same method as that described in Embodiment 1.

To 100 grams of these positive active materials was added 10 grams of carbon powder as a conducting agent, 5 grams of polyvinylidine fluoride as a binder and dimethyl formamide to make a paste. The paste was placed on a core sheet of titanium and was then dried to form a positive electrode. The negative electrode was prepared by coating a core sheet of nickel with a mixture comprising graphite as the main constituent which was then dried.

A battery was assembled using the method described in Embodiment 1, and was finished by pouring a nonaqueous electrolyte comprising propylene carbonate solution containing lithium perchlorate at a concentration of 1 mol/l and n-butyllithium at a concentration of 2 mol/l. The battery containing $LiMn_2O_4$ as the positive active material was designated (K), and that containing $LiCoO_2$ was designated (L).

For comparison, two additional batteries (a1) and (b1) were made, wherein the nonaqueous electrolyte comprising propylene carbonate solution contained only lithium perchlorate at a concentration of 1 mol/l. In these batteries the positive active materials were $LiMn_2O_4$ and $LiCoO_2$, respectively.

The results of charging and discharging test of these batteries are shown in Table 6.

TABLE 6

| Battery | Positive Active Material | Negative Active Material | 1st Cycle | | 2nd Cycle | (Unit: mAh) |
|---|---|---|---|---|---|---|
| | | | Charge Capacity | Discharge Capacity | Charge Capacity | Discharge Capacity |
| Embodiment | | | | | | |
| (K) | $LiMn_2O_4$ | graphite | 493 | 408 | 409 | 409 |
| (L) | $LiCoO_2$ | graphite | 554 | 463 | 460 | 460 |
| Comparison | | | | | | |
| (a1) | $LiMn_2O_4$ | graphite | 410 | 328 | 327 | 327 |
| (b2) | $LiCoO_2$ | graphite | 462 | 369 | 368 | 368 |

In battery (K), an embodiment of the present invention, $LiMn_2O_4$, the positive active material, increased in lithium content such that $Li_xMn_2O_4$ (x>1) was formed, by virtue of the fact that the electrolyte contained n-butyllithium. This excessive lithium was used to compensate for the difference in lithium content corresponding to the charging-discharging capacity difference occurring in the battery (a1).

The charging and discharging capacities of the first cycle of the battery (L) was 493 mAh and 408 mAh respectively. In this case there was a charging-discharging capacity difference of 85 mAh during the first cycle. The lithium content corresponding to this 85 mAh was absorbed by graphite or the negative active material holder similar to battery (a1), and did not participate in the charging and discharging reaction thereafter. However, the lithium which was absorbed by graphite and did not participate in the next cycle of charging and discharging was filled up by the lithium absorbed excessively in the positive active material. During the second cycle of charging and discharging, the lithium content x in $Li_xMn_2O_4$ or in the positive active material was within the range of 0.3 to 1.0, and the amount of lithium used during charging and discharging was about 0.7 electron. Thus the decrease in capacity of the battery due to the negative active material holder could be prevented. As for battery (L), the situation was the same in that the charging-discharging capacity difference after the second cycle was observed to be large compared with battery (b1).

As described above, a battery which has a larger charging and discharging capacity can be obtained by estimating the charging-discharging capacity difference of the negative electrode and then adding butyllithium to the electrolyte before assembling the battery. However, the charging-discharging capacity difference of a negative electrode varies depending upon the kind of negative material holder or the ratio of the contents in the mixture.

The material comprising the negative electrode need not be confined to graphite but any other material which can absorb and desorb lithium with a capacity difference, e.g., aluminum or aluminum alloy can also be used according to the present invention.

Further, in addition to $LiMn_2O_4$ and $LiCoO_2$ as the positive active material $LiMnO_2$, $LiNiO_2$, $LiFeO_2$ or $\gamma\text{-}LiV_2O_5$ may also be used.

Regarding the compounds useful for increasing the Li content, in addition to n-butyllithium, referred to above, sec-butyllithium

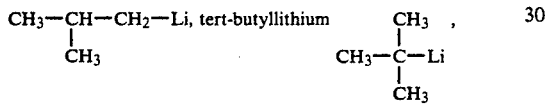

and phenyllithium also generate the same results. Among them tert-butyllithium was the most reactive against the positive active material followed by sec-butyllithium, n-butyllithium and phenyllithium in this order, although the n-butyllithium was the easiest to use.

Referring to the nonaqueous electrolyte as organic electrolyte solution, in addition to propylene carbonate and lithium perchlorate, lithium hexafluorophosphate, lithium trifluoromethanesulfonate and lithium borofluoride can be used as the solute. Carbonates such as propylene carbonate, ethylene carbonate, and esters such as $\gamma$-buty-lactone, methyl acetate can be used as the solvent to generate the same results. Also, the present invention can be applied to a lithium secondary battery which uses a nonaqueous electrolyte such as a solid polymer electrolyte.

The secondary battery comprising a nonaqueous electrolyte according to the present invention can prevent deterioration of the battery following overdischarge, which occurs when the negative electrode comprises an active material having a charging-discharging capacity difference during the first cycle.

As explained above, by including a lithium-adding process to the positive active material, ($LiMn_2O_4$, $LiMnO_2$, $LiCoO_2$, $LiNiO_2$, $LiFeO_2$, or $\gamma\text{-}LiV_2O_5$), or to the negative active material holder, (carbon, such as graphite or aluminum or aluminum alloy), which comprises dipping these compounds in a solution containing lithium-adding organic material such as butyllithium or phenyllithium after the fabrication of the electrode, following synthesis of the electrode group, or after the placing of the electrode group in a battery case, or by adding the lithium-adding organic material to the electrolyte, it is now possible not only to carry out the various processes involved in the synthesis of the battery such as pulverizing, classification of the active materials or fabrication of electrode, in a normal atmosphere containing moisture. In addition, water may even be used as a solvent for these processes, resulting in an improvement of work efficiency. Further, an improved battery which does not have a capacity-decrease due to the charging-discharging capacity difference of the negative electrode is generated.

We claim:

1. A secondary battery comprising a positive electrode, a negative electrode and a nonaqueous electrolyte containing a lithium salt, wherein the positive electrode is made by dipping an electrode consisting essentially of a positive active material selected from the group consisting of $LiMn_2O_4$, $LiMn_2O$, $LiCoO_2$, $LiNiO_2$, $LiFeO_2$ and $\gamma\text{-}LiV_2O_5$, in a solution containing at least one lithium-adding organic material selected from the group consisting of n-butyllithium, sec-butyllithium, tert-butyllithium, phenyllithium, and naphthyllithium, wherein the negative electrode contains negative active material holder consisting essentially of a compound selected from the group consisting of carbon, aluminum, and aluminum alloy, which can absorb and desorb lithium ions by charging and discharging, wherein said lithium salt is selected from the group consisting of lithium perchlorate, lithium hexafluorophosphate, lithium trifluoromethanesulfonate and lithium borofluoride, and wherein said nonaqueous electrolyte is selected from the group consisting of propylene carbonate, ethylene carbonate, $\gamma$-buty lactone and methylacetate.

2. A secondary battery comprising a positive electrode, a negative electrode and a nonaqueous electrolyte containing a lithium salt, wherein the positive electrode consists essentially of at least one positive active material selected from the group consisting of $LiMn_2O_4$, $LiMnO_2$, $LiCoO_2$, $LiNiO_2$, $LiFeO_2$ and $\gamma LiV_2O_5$, and the negative electrode is prepared by dipping an electrode containing negative active material holder consisting essentially of a compound selected from the group consisting of carbon, aluminum and aluminum alloy, which can absorb or desorb lithium by charging and discharging, in a solution containing at least one lithium-adding organic material selected from the group consisting of n-butyllithium, sec-butyllithium, tert-butyllithium, phenyllithium, and naphthyllithium, wherein said lithium salt is selected from the group consisting of lithium perchlorate, lithium hexafluorophosphate, lithium trifluoromethanesulfonate and lithium borofluoride, and wherein said nonaqueous electrolyte is selected from the group consisting of propylene carbonate, ethylene carbonate, $\gamma$-buty-lactone and methylacetate.

3. A method of manufacturing a secondary battery with a nonaqueous electrolyte comprising the steps of:

preparing an electrode group with a positive electrode of a positive active material selected from the group consisting of $LiMn_2O_4$, $LiMnO_2$, $LiCoO_2$, $LiNiO_2$, $LiFeO_2$ and $\gamma\text{-}LiV_2O_5$, and a negative electrode containing negative active material holder consisting essentially of a compound selected from the group consisting of carbon, aluminum and aluminum alloy, which absorbs and desorbs lithium ions by charging and discharging with a separator therebetween, dipping the electrode group in a solution containing at least one compound selected from the group consisting of n-butyllithium, sec-butyllithium, tert-butyllithium, phenyllithium, and naphthyllithium, and drying the electrode group, placing the electrode group in a battery case, and supplying the battery case with a nonaqueous electrolyte containing a lithium salt, wherein said lithium salt is selected from the group consisting of lithium perchlorate lithium hexafluorophosphate, lithium trifluoromethanesulfonate and lithium borofluoride, and wherein said nonaqueous electrolyte is selected from the group consisting of propylene carbonate, ethylene carbonate, γ-buty-lactone and methylacetate.

4. A method of manufacturing a secondary battery with a nonaqueous electrolyte comprising the steps of:

preparing an electrode group with a positive electrode of positive active material selected from the group consisting of $LiMn_2O_4$, $LiMnO_2$, $LiCoO_2$, $LiNiO_2$, $LiFeO_2$ and $\gamma$-$LiV_2O_5$, and a negative electrode containing negative active material holder consisting essentially of a compound selected from the group consisting of carbon, aluminum and aluminum alloy, which absorbs and desorbs lithium ions by charging and discharging with a separator therebetween, placing the electrode group in a battery case, supplying the battery case with a solution containing at least one compound selected from the group consisting of n-butyllithium, sec-butyllithium, tert-butyllithium, phenyllithium, and naphthyllithium, and removing the solution, supplying the battery case with a nonaqueous electrolyte containing a lithium salt, wherein said lithium salt is selected from the group consisting of lithium perchlorate, lithium hexafluorophosphate, lithium trifluoromethanesulfonate and lithium borofluoride, and wherein said nonaqueous electrolyte is selected from the group consisting of propylene carbonate, ethylene carbonate, γ-buty-lactone and methylacetate.

5. A secondary battery comprising a positive electrode, a negative electrode, and a nonaqueous electrolyte containing a lithium salt, wherein the positive electrode consists essentially of a positive active material selected from the group consisting of $LiMn_2O_4$, $LiMnO_2$, $LiCoO_2$, $LiFeO_2$ and $\gamma$-$LiV_2O_5$, the negative electrode contains negative active material holder consisting essentially of a compound selected from the group consisting of carbon, aluminum and aluminum alloy which absorbs and desorbs lithium ions by charging and discharging, the nonaqueous electrolyte consists of organic electrolyte containing at least one lithium-adding organic material selected from the group consisting of n-butyllithium, sec-butyllithium, tert-butyllithium, and phenyllithium, wherein said lithium salt is selected from the group consisting of lithium perchlorate, lithium hexafluorophosphate, lithium trifluoromethanesulfonate and lithium borofluoride, and wherein said nonaqueous electrolyte is selected from the group consisting of propylene carbonate, ethylene carbonate, γ-buty-lactone and methylacetate.

* * * * *

UNITED STATES PATENT AND TRADEMARK OFFICE
CERTIFICATE OF CORRECTION

PATENT NO.    : 5,316,875
DATED         : May 31, 1994
INVENTOR(S)   : Murai et al.

It is certified that error appears in the above-identified patent and that said Letters Patent is hereby corrected as shown below:

In column 14, claim 5, line 18, after "$LiCoO_2$" insert the formula --$LiNiO_2$--.

Signed and Sealed this

Third Day of October, 1995

BRUCE LEHMAN

*Attest:*

*Attesting Officer*   Commissioner of Patents and Trademarks